US006952383B2

United States Patent
Chen

(10) Patent No.: US 6,952,383 B2
(45) Date of Patent: Oct. 4, 2005

(54) OPTICAL DISC DEVICE WITH A WOBBLE CONTROL CIRCUIT

(75) Inventor: Cheng-Hung Chen, Nan-Tou Hsien (TW)

(73) Assignee: Via Technologies, Inc., Hsin-Tien (TW)

( * ) Notice: Subject to any disclaimer, the term of this patent is extended or adjusted under 35 U.S.C. 154(b) by 517 days.

(21) Appl. No.: 10/063,201

(22) Filed: Mar. 28, 2002

(65) Prior Publication Data

US 2002/0167877 A1 Nov. 14, 2002

(30) Foreign Application Priority Data

May 11, 2001 (TW) ........................................ 90111346 A

(51) Int. Cl.[7] ............................................. G11B 7/095
(52) U.S. Cl. ................................ 369/44.32; 369/44.35; 369/53.14
(58) Field of Search ........................... 369/44.32, 44.35, 369/44.36, 53.14, 53.28

(56) References Cited

U.S. PATENT DOCUMENTS

| 6,442,113 B2 * | 8/2002 | Lin ........................ 369/44.35 |
| 6,459,665 B2 * | 10/2002 | Chu ........................ 369/44.35 |
| 6,657,926 B2 * | 12/2003 | Burroughs ............... 369/13.22 |
| 6,816,445 B2 * | 11/2004 | Leenknegt ............... 369/47.25 |
| 6,842,414 B1 * | 1/2005 | Park ........................ 369/53.19 |

* cited by examiner

Primary Examiner—W. R. Young
Assistant Examiner—Lixi Chow
(74) Attorney, Agent, or Firm—Winston Hsu

(57) ABSTRACT

An optical disc drive for accessing data stored on an optical disc is disclosed. The optical disc drive includes: a sled inside the optical disc drive, the sled sliding relative to the optical disc; an actuator on the sled, the actuator wobbling relative to the optical disc; and a control circuitry for controlling the optical disc drive. The control circuitry includes a focus compensation device for compensating focus errors caused by wobbles of the optical disc generated during rotations of the optical disc; and a high frequency compensator for compensating focus errors caused by wobbles of the optical disc generated during rotations of the optical disc at a frequency higher than a predetermined frequency. The focus compensation device controls the actuator to wobble upward and downward according to wobbles of the optical disc so as to substantially keep up wobbles of the actuator with the wobbles of the optical disc. When the optical disc is rotated at a frequency higher than the predetermined frequency, the high frequency compensator controls the actuator to wobble upward and downward so as to substantially keep up the wobbles of the actuator with the wobbles of the optical disc.

18 Claims, 4 Drawing Sheets

OPTICAL DISC DEVICE WITH A WOBBLE CONTROL CIRCUIT

BACKGROUND OF INVENTION

1. Field of the Invention

The present invention relates to an optical disc (for example, compact disc (CD), DVD, etc.) drive. More specifically, the present invention discloses an optical disc drive with a high frequency compensator for preventing data access failure caused by wobbles of the disc.

2. Description of the Prior Art

With current technology, CDs have the characteristics of being light weight, having a small physical volume, and having a low cost. In addition, CDs have a high capacity for information storage, making CDs an indispensable information-storing medium.

Please refer to FIG. 1. FIG. 1 is a perspective view of a prior optical disc drive 10. The optical disc drive 10 comprises a housing 12 and a rotatable platform 16 installed on the housing 12. The platform 16 is designed for a CD 14 to be placed thereon. Additionally, the housing 12 has a hole 17 inside the housing 12. A sled 18 slides along a direction of the hole 17 for accessing the data stored on the CD 14.

Please refer to FIG. 2. FIG. 2 is a diagram of the internal mechanisms of the prior optical disc drive 10. For accessing data stored on the CD 14 in high-density, the optical disc drive 10 has control circuitry 38 for controlling the optical disc drive 10. The housing 12 of the optical disc drive 10 is omitted in FIG. 2 to show internal structures clearly, and only a portion of the CD 14 is shown in FIG. 2. The optical disc drive 10 has a motor 15 disposed inside the housing 12 for driving the rotation of the platform 16 and further driving the rotation of the CD 14 on the platform 16. The sled 18 slides along a track 30 inside the housing 12 (slides along directions 34) for accessing the data stored on the CD 14. The sled 18 has an actuator 22 sliding along directions 35, and an optical component 32 (such as a lens) fixed on the actuator 22. Additionally, a light source 26 disposed on the sled 18 is coupled to the actuator 22 via an optical path.

The data access operations can be described as follows. Light emitted from the light source 26 of the sled 18 is guided onto the actuator 22 through the optical path (commonly, the optical path comprises a reflection or a refraction process of a reflector and a prism), and focused onto a bottom surface of the CD 14 by the optical component 32. The light signal, which is modulated and reflected by the CD 14, is reflected back to the optical component 32 of the actuator 22. The optical disc drive 10 accesses the data stored on the CD 14 by analyzing the reflection light.

The light generated from the light source 26 must be accurately focused onto the CD 14 by the optical component 32 of the actuator 22 for assuring accuracy of data access. Therefore, the optical disc drive 10 can exactly analyze the light reflected from the CD 14 and further access data stored on the CD 14. The optical component 32 has a certain focus range, so the actuator 22 must keep within a certain vertical distance from the CD 14 so as to enable light to be accurately focused onto the CD 14. In order to control the actuator 22 to ensure the accuracy of focus, the control circuitry 38 of the optical disc drive 10 comprises a focus compensation device 48, and the sled 18 also comprises a sensor 28 optically coupled to the actuator 22.

The light generated from the light source 26 and reflected from the CD 14 to the optical component 32 is analyzed by the optical disc drive 10 to access data stored on the CD 14. Furthermore, a portion of the reflected light is incident to the sensor 28 through the optical path. The sensor 28 analyzes the reflected light and generates an error signal, which indicates a focus error of the light from the optical component 32 onto the CD 14. The error signal generated by the sensor 28 is transmitted to the control circuitry 38. When magnitude of the error signal is greater, the focus error is greater. In addition, a positive or a negative symbol of the error signal indicates that the distance between the actuator 22 and the CD 14 is either too near or too far. The focus compensation device 48 inside the control circuitry 38 controls the actuator 22 to wobble upward and downward. The focus compensation device 48 changes the vertical distance between the actuator 22 and the CD 14 according to the error signal, and further reduces the focus error.

The optical disc drive 10 uses the focus compensation device 48 to control the vertical location of the actuator 22 and reduce the focus error. But, the prior focus compensation device 48 is used to compensate for the focus error due to disturbance at low frequencies. Besides, the focus error results from that the CD 14 cannot rotate on a perfect plane without vertical disturbance due to the unevenness of its structure. An ideal optical disc has a perfect circular disc surface. When the motor 15 rotates the ideal optical disc, the actuator 22 can keep a certain distance with the surface of the optical disc without wobble upward and/or downward. However, in reality, the optical disc has a curved or scraggy surface caused by the manufacturing process. When the motor 15 rotates such a curved or scraggy optical disc, the vertical distance between the scraggy surfaces of the optical disc and the sled 18 inconstantly changed as the optical disc rotates. As the disc is read, the focus compensation device 48 controls the actuator 22 to wobble in synchronization with the wobble of the optical disc so that the light is accurately focused onto the optical disc by the optical component 32 of the actuator 22.

As the optical disc is rotated, the uneven portion of the optical disc causes a periodic variation of the vertical distance between the optical disc and the sled 18. To account for this variation, the focus compensation device 48 controls the actuator 22 to wobble upward and downward so as to keep the vertical distance between the optical disc and the sled 18 constant according to the periodic variation. As known, the higher the data access rate is, the higher the rotation speed of the motor 15 is. Thus, the frequency change of the vertical distance is very high. The control response of the focus compensation device 48 cannot solve problems resulted from high frequency variation. Instead, the prior optical disc drive 10 reduces the rotation speed of the motor 15 to control the focus error better. Obviously, such prior method cannot meet requirements for a high data access rate.

SUMMARY OF INVENTION

It is therefore a primary objective of the claimed invention to provide an optical disc drive with a high frequency compensator for controlling focus errors effectively in a high frequency condition.

The claimed invention discloses an optical disc drive with a high frequency compensator. The optical disc drive includes: a housing; a sled installed inside the housing, the sled sliding relative to the optical disc; an actuator installed on the sled, the actuator wobbling relative to the optical disc; control circuitry, and a high frequency compensator. The control circuitry has a focus compensation device for compensating focus errors caused by wobbles of the optical disc generated during rotations of the optical disc. The high frequency compensator is used to compensate for focus errors caused by wobbles of the optical disc generated by rotations of the optical disc at a frequency higher than a predetermined frequency. When the optical disc is rotated at a frequency higher than the predetermined frequency, the high frequency compensator controls the actuator to wobble upward and downward so as to keep up the wobbles of the actuator with the wobbles of the optical disc.

It is an advantage of the claimed invention that the optical disc drive has a high frequency compensator. Therefore, focus error caused by unevenness of the optical disc is compensated for so as to prevent data access failure caused by wobbles of the optical disc.

These and other objectives and advantages of the present invention will no doubt become obvious to those of ordinary skill in the art after reading the following detailed description of the preferred embodiment that is illustrated in the various figures and drawings.

DETAILED DESCRIPTION

Figure 1:
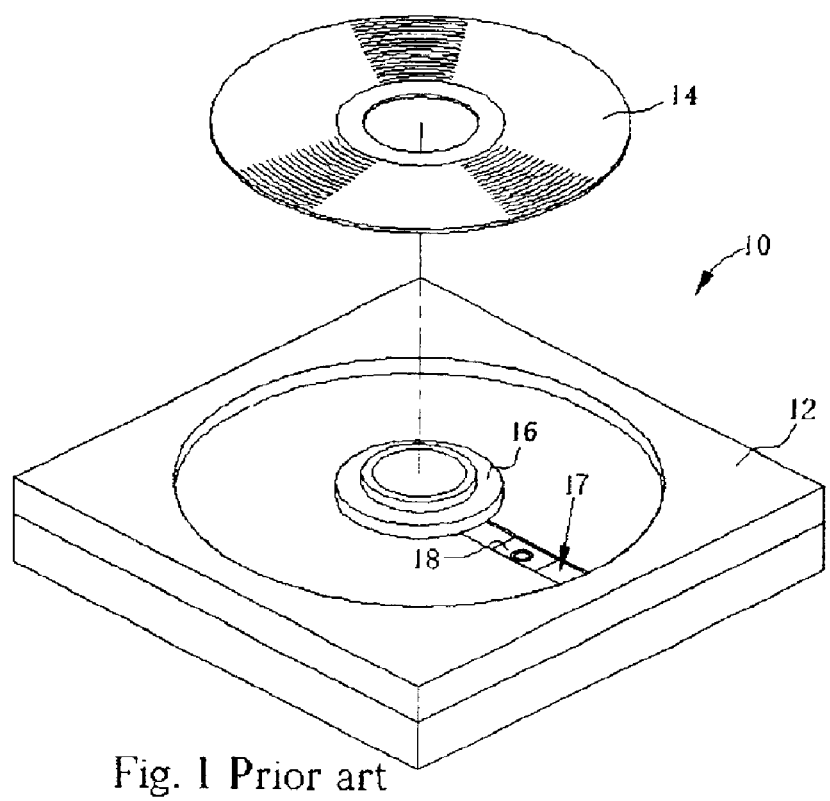
FIG. 1 is a perspective view of an optical disc drive according to the prior art.
Figure 2:
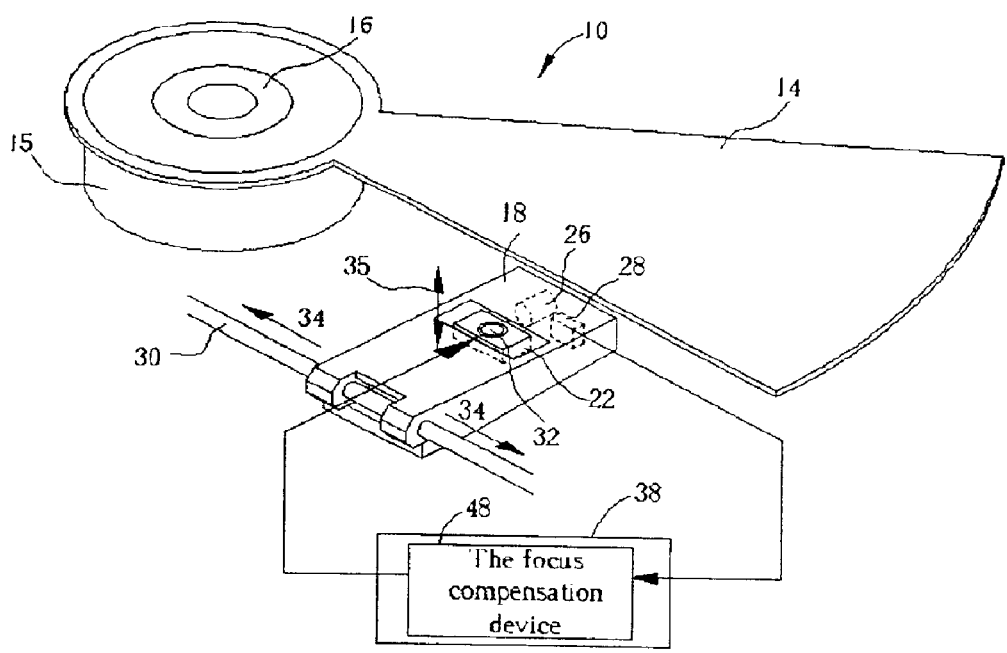
FIG. 2 is a simplified diagram of internal mechanisms of the optical disc drive according to the prior art.
Figure 3:
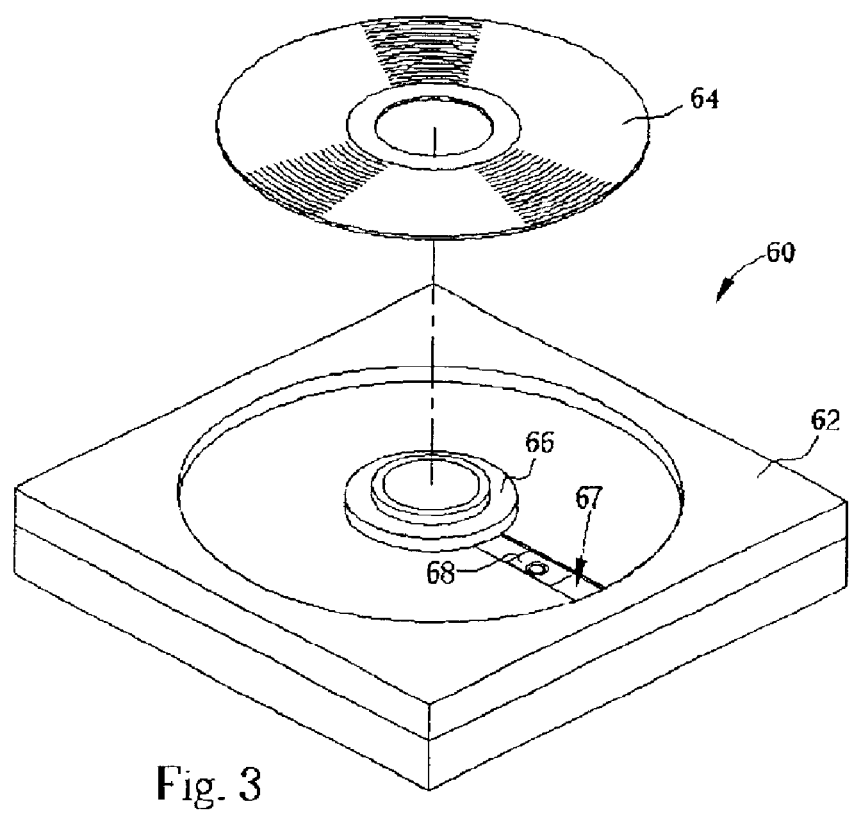
FIG. 3 is a perspective view of an optical disc drive according to the present invention.

Please refer to FIG. 3. FIG. 3 is a perspective view of an optical disc drive 60 according to the present invention. The optical disc drive 60 comprises a housing 62 and a rotatable platform 66 installed on the housing 62. The platform 66 is designed for an optical disc (for example, CD) 64 to be placed thereon. Additionally, the housing 62 has a hole 67 inside the housing 62. A sled 68 slides along a direction of the hole 67 for accessing data stored on the CD 64.

Figure 4:
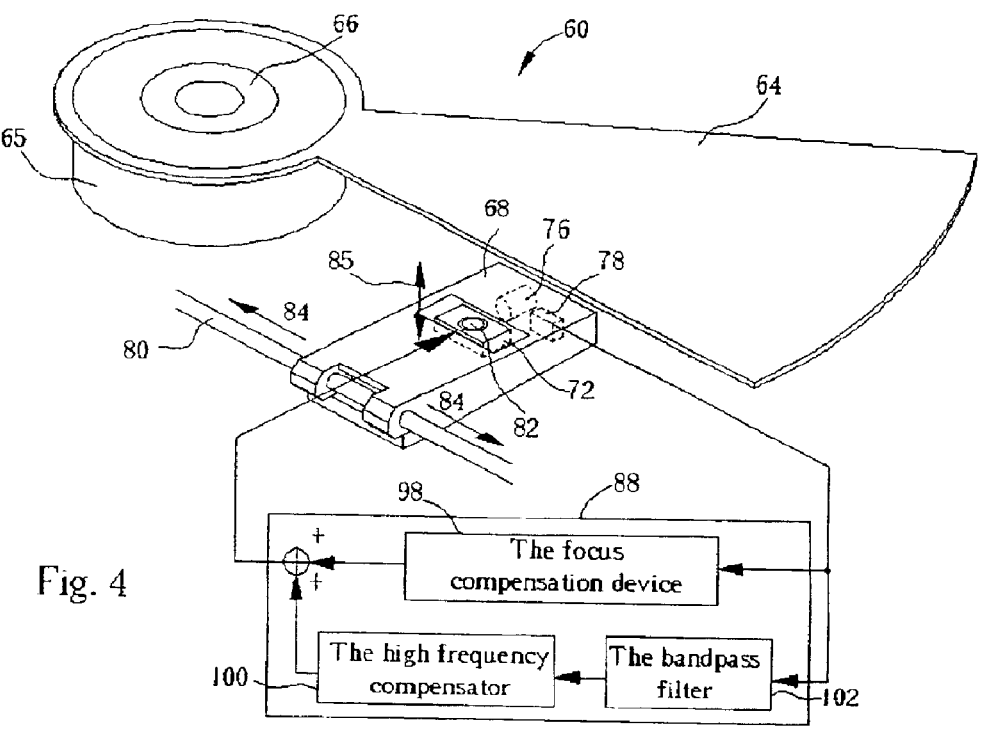
FIG. 4 is a diagram of internal mechanisms of the optical disc drive according to the present invention.

Please refer to FIG. 4. FIG. 4 is a simplified diagram of internal mechanisms of the optical disc drive 60 according to the present invention. The housing 62 of the optical disc drive 60 is omitted in FIG. 4 to show internal structures clearly, and only a portion of the optical disc 64 is shown. The optical disc drive 60 has a motor 65 inside the housing 62 for driving the rotation of the platform 66 and further driving the rotation of the CD 64 on the platform 66. The sled 68 slides along a path 80 inside the housing 62 (toward directions 84) for accessing the data stored on the CD 64. The sled 68 has an actuator 72 sliding along directions 85, and an optical component 82 (such as a lens) is fixed on the actuator 72. Additionally, a light source 76 disposed on the sled 68 is optically coupled to the actuator 72. When the optical disc drive 60 accesses data stored on the CD 64, light emitted from the light source 76 is transmitted to the actuator 72 and then focused onto the CD 64 through the optical component 82 of the actuator 72. The light reflected from the CD 64 is collected by the optical component 82 so that the optical disc drive 60 can access data stored on the CD 64.

The optical disc drive 60 of the present invention also has a sensor 78 disposed on the sled 68, wherein the sensor 78 is optically coupled to the actuator 72 for controlling the light to be accurately focused on the CD 64 through the optical component 82 of the actuator 72 during data access. The sensor 78 can also analyze the light reflected from the CD 64 and obtain error signals. Additionally, the optical disc drive 60 has control circuitry 88 for controlling a mechanical system of the optical disc drive 60. The main difference between the optical disc drive 60 of the present invention and the prior optical disc drive 10 is that, the control circuitry 88 comprises a focus compensation device 98, a band-pass filter 102, and a high frequency compensator 100. Function of the focus compensation device 98 is more than that of the focus compensation device 48. The error signals generated by the sensor 78 are transmitted to the control circuitry 88. After receiving the error signals, the focus compensation device 98 of the control circuitry 88 controls the actuator 72 to wobble upward and downward so as to reduce the focus error.

As mentioned above, the focus compensation device 98 is used to compensate for the focus errors caused by perturbations at low frequency, but it cannot compensate for the focus errors caused by defects of the optical disc itself. Therefore, in the present invention, the high frequency compensator 100 is used for compensating focus errors in high frequency. Operation of the high frequency compensator 100 is described as follows. The error signals generated from the sensor 78 are not only transmitted to the focus compensation device 98 of the control circuitry 88, but also transmitted to the band-pass filter 102. In the preferred embodiment of the invention, a range of bandwidth of the band-pass filter 102 is set from 50 to 170 Hz. The band-pass filter 102 can filter out a low frequency portion of the error signals, which are low-frequency perturbations during a focus process. The focus compensation device 98 compensates the low-frequency perturbations. A lowest frequency of the bandwidth range of the band-pass filter 102 is set as a threshold value. The focus compensation device 98 compensates for low-frequency focus errors with frequencies lower than the threshold value. Oppositely, the high-frequency focus errors with frequencies higher than the threshold value are passed through the band-pass filter 102 and compensated by the high frequency compensator 100. Characteristics of the high frequency perturbations are important in setting the highest frequency of the bandwidth of the band-pass filter 102. A defect manufacturing process leaves the surface of the optical disc uneven and therefore, the distance between the rotating optical disc and the sled 68 varies periodically, and the period of the focus error is the same as that the rotating period of the optical disc. Currently, the angular velocity of the spindle motor is generally lower than 170 Hz, so the highest frequency of the bandwidth of the band-pass filter 100 is 170 Hz (the same as the highest angular velocity of the spindle motor). Thus, the band-pass filter 102 is set to filter high-frequency signals above 170 Hz, and obtains the focus errors caused by the uneven optical disc, from the error signals.

After passed through the band-pass filter 102, the error signals are transmitted to the high frequency compensator 100. The high frequency compensator 100 performs a compensation process on the high-frequency focus errors according to the error signals being passed through the band-pass filter 102. Furthermore, the focus compensation device 98 compensates the focus errors according to control responses of the focus compensation device 98. With two different control responses of the focus compensation device 98 and the high frequency compensator 100, the optical disc drive 60 of the present invention compensates the low-frequency focus errors and the high-frequency focus errors. The high frequency compensator 100 can directly perform the compensation process on the high frequency focus errors according to the error signals being passed through the band-pass filter without reducing the rotation speed of the optical disc drive 60. Thus, a high data-access rate is maintained.

In the preferred embodiment, the high frequency compensator 100 is an amplifier that amplifies the error signals filtered through the band-pass filter 102 for modulating amplitudes of the signals. The control circuitry 88 controls the actuator 72 to wobble upward and downward according to the amplified signals and the control signals of the focus compensation device 98 for controlling the actuator 72. The operation characteristics of the high frequency compensator 100 relate to the whole control response of the control circuitry 88 and the mechanical characteristics of the actuator 72. Besides, the amplification of the amplifier can be a negative amplification.

The above discussion about the optical disc drive 60 is in accordance with the compensation of the focus errors when the optical disc drive 60 accesses data stored on the optical disc. If the optical disc drive 60 has an ability to write data onto the optical disc, the high frequency compensator 100 of the present invention is still adapted to control the focus errors in writing process. Therefore, principles and spirit of this invention can also be applied to the focus control when the optical disc drive accesses or writes data from or onto the optical disc.

In contrast to the prior art, the optical disc drive 60 of the present invention has a high frequency compensator. Therefore, a focus error caused by unevenness of the disc is compensated so as to prevent failure during data access.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. An optical disc drive for accessing data stored on an optical disc comprising:
   a sled inside the optical disc drive, and the sled sliding relative to the optical disc;
   an actuator on the sled, the actuator wobbling relative to the optical disc;
   a light source disposed on the sled and optically coupled to the actuator for generating focus error signals;
   control circuitry for controlling the optical disc drive, the control circuitry comprising a focus compensation device for compensating focus errors caused by wobbles of the optical disc generated during rotations of the optical disc; and
   a high frequency compensator for compensating focus errors caused by wobbles of the optical disc generated during the optical disc rotated at a frequency higher than a predetermined frequency;
   wherein the focus compensation device controls the actuator to wobble upward and downward according to wobbles of the optical disc so as to substantially keep up wobbles of the actuator with the wobbles of the optical disc; and
   wherein when the optical disc is rotated at a frequency higher then the predetermined frequency, the high frequency compensator controls the actuator to wobble upward and downward so as to substantially keep up the wobbles of the actuator with the wobbles of the optical disc.

2. The optical disc drive of claim 1, further comprising a sensor for detecting the focus errors of the optical disc drive and generating corresponding error signals.

3. The optical disc drive of claim 2, further comprising a band-pass filter electrically connected to the sensor for filtering the error signals.

4. The optical disc drive of claim 3 wherein the high frequency compensator controls the wobbles of the actuator according to the error signals filtered by the band-pass filter.

5. The optical disc drive of claim 3, wherein the predetermined frequency is the lowest frequency of a bandwidth of the band-pass filter.

6. The optical disc drive of claim 3, wherein the highest frequency of a bandwidth of the band-pass filter corresponds to the highest angular velocity of a spindle motor of the optical disc drive.

7. The optical disc drive of claim 3, wherein the high frequency compensator is an amplifier.

8. The optical disc drive of claim 3, wherein the highest frequency of a bandwidth of the band-pass filter is equal to the highest angular velocity of a spindle motor of the optical disc drive.

9. The optical disc drive of claim 3, wherein the band-pass filter has a frequency range of 50 Hz to 170 Hz.

10. A control circuit of an optical disc drive for accessing data stored on an optical disc; the optical disc drive comprising: a sled inside the optical disc drive, the sled sliding relative to the optical disc, an actuator on the sled, the actuator wobbling relative to the optical disc, and a light source disposed on the sled and optically coupled to the actuator for generating focus error signals; the control circuit comprising:
    a focus compensation device for compensating focus errors caused by wobbles of the optical disc generated during rotations of the optical disc; and
    a high frequency compensator for compensating focus errors caused by wobbles of the optical disc generated during the optical disc rotated at a frequency higher than a predetermined frequency;
    wherein the focus compensation device controls the actuator to wobble upward and downward according to wobbles of the optical disc so as to substantially keep up wobbles of the actuator with the wobbles of the optical disc; and
    wherein when the optical disc is rotated at a frequency higher than the predetermined frequency, the high frequency compensator controls the actuator to wobble upward and downward so as to substantially keep up the wobbles of the actuator with the wobbles of the optical disc.

11. The control circuit of claim 10, wherein the optical disc drive further comprises a sensor for detecting the focus errors of the optical disc drive and generating corresponding error signals.

12. The control circuit of claim 11, further comprising a band-pass filter electrically connected to the sensor for filtering the error signals.

13. The control circuit of claim 12, wherein the high frequency compensator controls the wobbles of the actuator according to the error signals filtered by the band-pass filter.

14. The control circuit of claim 12, wherein the predetermined frequency is the lowest frequency of a bandwidth of the band-pass filter.

15. The control circuit of claim 12, wherein the highest frequency of a bandwidth of the band-pass filter corresponds to the highest angular velocity of a spindle motor of the optical disc drive.

16. The control circuit of claim 12, wherein the highest frequency of a bandwidth of the band-pass filter is equal to the highest angular velocity of a spindle motor of the optical disc drive.

17. The control circuit of claim 12, wherein the band-pass filter has a frequency range of 50 Hz to 170 Hz.

18. The control circuit of claim 11, wherein the high frequency compensator is an amplifier.

* * * * *